(12) United States Patent
Miao et al.

(10) Patent No.: US 12,315,197 B2
(45) Date of Patent: May 27, 2025

(54) SYSTEMS AND METHODS FOR VALIDATING CAMERA CALIBRATION IN REAL-TIME

(71) Applicant: Volkswagen Group of America Investments, LLC, Reston, VA (US)

(72) Inventors: Hsin Miao, Sunnyvale, CA (US);
Hatem Alismail, Pittsburgh, PA (US);
Dikpal Reddy, Palo Alto, CA (US);
Richard L. Kwant, San Bruno, CA (US)

(73) Assignee: VOLKSWAGEN GROUP OF AMERICA INVESTMENTS, LLC, Reston, VA (US)

( * ) Notice: Subject to any disclaimer, the term of this patent is extended or adjusted under 35 U.S.C. 154(b) by 427 days.

(21) Appl. No.: 17/409,472

(22) Filed: Aug. 23, 2021

(65) Prior Publication Data
US 2023/0145561 A1    May 11, 2023

(51) Int. Cl.
*G06T 7/80*  (2017.01)
*G06T 7/70*  (2017.01)
*G06V 10/74*  (2022.01)
*G06V 20/58*  (2022.01)

(52) U.S. Cl.
CPC .............. *G06T 7/80* (2017.01); *G06T 7/70* (2017.01); *G06V 10/761* (2022.01); *G06V 20/584* (2022.01)

(58) Field of Classification Search
CPC ....... G06T 7/80; G06V 20/584; G06V 10/761
See application file for complete search history.

(56) References Cited

U.S. PATENT DOCUMENTS

| | | |
|---|---|---|
| 9,201,424 B1 | 12/2015 | Ogale |
| 10,176,596 B1 | 1/2019 | Mou |
| 10,436,885 B2 | 10/2019 | Wheeler et al. |
| 10,531,004 B2 | 1/2020 | Wheeler et al. |

(Continued)

FOREIGN PATENT DOCUMENTS

| | | |
|---|---|---|
| EP | 3438872 A1 | 2/2019 |
| WO | 2016153224 A1 | 9/2016 |
| WO | 2020/014683 A1 | 1/2020 |

OTHER PUBLICATIONS

Liao, Q. et al., Extrinsic Calibration of 3D Range Finder and Camera without Auxiliary Object or Human Intervention, ResearchGate, Mar. 2017, available at https://www.researchgate.net/publication/314942875.

*Primary Examiner* — Andrew W Bee
*Assistant Examiner* — Devin J Dhooge
(74) *Attorney, Agent, or Firm* — Fox Rothschild LLP (57) ABSTRACT

Methods and systems for determining whether a camera of an autonomous vehicle (AV) is calibrated are disclosed. The method includes using image frames captured by a camera of the AV and LIDAR point clouds captured by a LIDAR system of the AV to calculate an AV pose calibration metric. The method also includes: measuring a distance metric between a three-dimensional bounding box around an object and a two-dimensional bounding box in an image captured by the camera; using the AV pose calibration metric and the distance calibration metric to generate a confidence score; and in response to the confidence score being below a threshold, generating a signal indicating that the camera is not calibrated.

20 Claims, 8 Drawing Sheets

(56) References Cited

U.S. PATENT DOCUMENTS

| | | |
|---|---|---|
| 10,678,260 B2 | 6/2020 | Mou |
| 10,724,865 B1 | 7/2020 | Ferguson et al. |
| 10,769,793 B2 | 9/2020 | Chen |
| 11,112,490 B2* | 9/2021 | Vu .......................... H01Q 15/18 |
| 2018/0189578 A1* | 7/2018 | Yang ...................... B60W 40/04 |
| 2019/0120947 A1 | 4/2019 | Wheeler et al. |
| 2019/0122386 A1* | 4/2019 | Wheeler ............ G01C 21/3602 |
| 2020/0120253 A1 | 4/2020 | Wheeler et al. |
| 2020/0145569 A1 | 5/2020 | Wheeler et al. |
| 2020/0192380 A1 | 6/2020 | Bernstein |
| 2020/0218979 A1* | 7/2020 | Kwon .................. G06F 18/2155 |
| 2020/0334861 A1 | 10/2020 | Jin et al. |
| 2021/0042535 A1* | 2/2021 | Abbott ...................... G06T 7/73 |
| 2021/0056325 A1 | 2/2021 | Wang |
| 2021/0174537 A1* | 6/2021 | Ye ........................... G06N 3/045 |
| 2021/0192788 A1 | 6/2021 | Diederichs et al. |

* cited by examiner

SYSTEMS AND METHODS FOR VALIDATING CAMERA CALIBRATION IN REAL-TIME

BACKGROUND

The present disclosure relates to autonomous vehicle camera calibration validation and, in particular, to validating camera calibration in autonomous vehicles in real-time using vehicle pose and traffic light detection information.

Autonomous driving requires perception and prediction of the surrounding environment, including other actors on the road. This aids in decreasing the potential for conflict between an autonomous vehicle (AV) and other actors and objects along a trajectory of the AV. The environment is often imaged using one or more cameras.

On an AV, camera calibration is used to align the position among cameras, other sensors, and the vehicle body. The calibration of an AV's cameras improves the accuracy of the images captured by the cameras and, therefore, also improves the accuracy of any object detection analysis performed on the images. However, camera calibration may change as time goes on because cameras are installed on the vehicle body mechanically and can experience the effects of vehicle vibration or other external factors. Camera calibration is typically performed while the AV is stopped, but calibration issues may arise while the AV is in motion, which means that the AV may operate with miscalibrated cameras until the vehicle is stopped. Existing methods for camera calibration validation while a vehicle is in motion require large amounts of computing power, making these methods unfeasible for use with AVs.

Therefore, for at least these reasons, systems and methods for validating camera calibration on AVs while the AVs are stopped or in motion while using minimal computing power is needed.

SUMMARY

This document describes methods, systems, and computer program products for determining whether a camera of an autonomous vehicle (AV) is calibrated. A system will use image frames captured by a camera of an AV, along with LIDAR point clouds captured by a LIDAR system of the AV, to calculate an AV pose calibration metric for the AV. The system will measure a distance metric between a three-dimensional (3D) bounding box around an object and a two-dimensional (2D) bounding box in an image captured by the camera. The system will use the AV pose calibration metric and the distance calibration metric to generate a confidence score. In response to the confidence score being below a threshold, the system will generate a signal indicating that the camera is not calibrated.

In some embodiments, calculating the AV pose calibration metric for the AV may include: (i) receiving a first image frame that the camera captured in a sequence at a first time point; (ii) receiving a second image frame that the camera captured at a second time point that is consecutive to the first time point in the sequence; (iii) receiving LIDAR point cloud data that the LIDAR system captured at the first time point or the second time point; (iv) projecting the LIDAR point cloud data over the first image frame to form a first projected image; (v) transforming the LIDAR point cloud data to account for a change in pose between the first time point and the second time point, yielding transformed point cloud data; (vi) projecting the transformed point cloud over the second image frame to form a second projected image; (vii) measuring a similarity between the first projected image and the second projected image; and (viii) using the similarity to calculate the AV pose calibration metric.

In some embodiments, calculating the distance calibration metric includes: (i) identifying an object in an image; (ii) applying a 3D bounding box to the object in the image; (iii) applying a 2D bounding box to the object in the image; and (iv) calculating the distance as a distance between the 3D bounding box and the 2D bounding box. Optionally, when the system identifies an object in the image, the system may look for and identify a traffic light in the image.

In some embodiments, the system may include the camera. The camera may capture the first image frame at the first time point, and it may capture the second image frame at the second time point. The system also may include the LIDAR system, which will generate the LIDAR point cloud data.

In some embodiments, in response to the confidence score being below the threshold, the system may performing an action assessment of the AV. Based on the action assessment, the system may cause the AV to perform an action such as recalibrating the camera, altering a trajectory of the AV, or altering a velocity of the AV.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "digital storage device" "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that when executed will cause the processor to perform a specified function.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "actor" refers to a moving or moveable object that the AV detects in its environment. The term "actor" includes, but is not limited to, vehicles, pedestrians, cyclists, and/or other objects which can move into the AV's path.

In this document, when terms such as "first" and "second" are used to modify a noun, such use is simply intended to distinguish one item from another, and such terms are not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Figure 1:
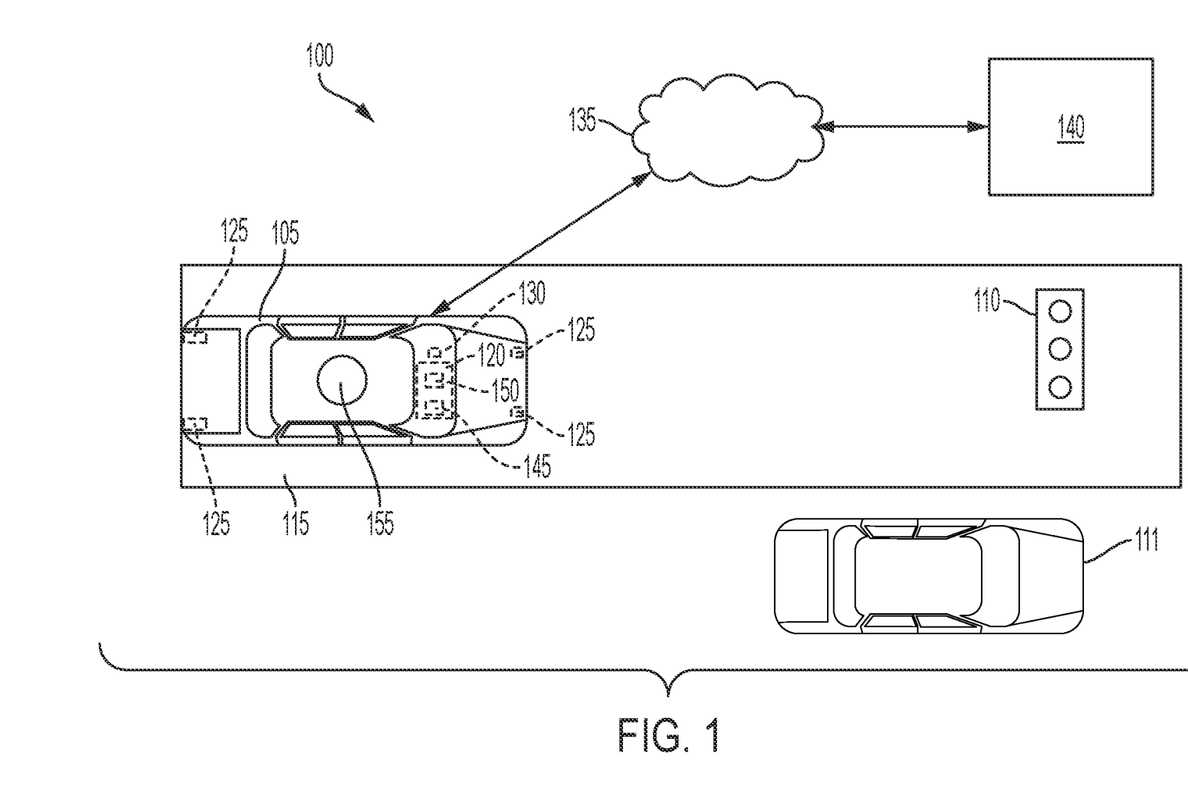
FIG. 1 is an example of a system for validating camera calibration on an autonomous vehicle, according to various embodiments of the present disclosure.

Referring now to FIG. 1, a system 100 for validating camera calibration is illustratively depicted, in accordance with various embodiments of the present disclosure.

According to various embodiments, the system 100 includes a vehicle 105 (e.g., an AV or another type of vehicle). The vehicle 105 is traveling on a road 115. It is noted, however, that any suitable path for the vehicle 105 may be implemented. The environment around an AV 105 will include various objects such as traffic lights 110, other vehicles 111, pedestrians, or other objects. These objects 110 may be stationary or in motion and may be, or may become, in the path of one or more trajectories of the AV 105. In order to accurately detect and photographically capture these one or more objects 110, the camera calibration system includes a calibration module of the AV 105, which is configured to calibrate one or more cameras 125 coupled to the AV 105.

The calibration module of the AV 105 may include one or more computing devices 120 configured to receive sensor data pertaining to each of the objects 110. The sensor data is generated by one or more cameras 125 that are coupled to the AV 105. The AV 105 may include additional sensors such as one or more RADAR systems, one or more light detection and ranging (LIDAR) systems 155, and/or one or more other suitable sensor types. The computing device 120 may be in electronic communication with the one or more sensors such as cameras 125 and LIDAR system 155. The one or more cameras 125 may be positioned at various positions of the AV 105 such as, for example, the front, rear, and/or sides of the AV 105 and/or any other suitable position or positions. The cameras 125 may include one or more pairs of stereo cameras. According to various embodiments, the AV 105 may include a plurality of cameras 125 encircling the AV 105.

The AV 105 may include a geographic location system configured to determine a location and orientation of the vehicle 105 and/or one or more of the objects 110, 111. The geographic location system may include a Global Positioning System device. It is noted, however, that other forms of geographic location may additionally, or alternatively, be used, such as high definition maps and programming that is configured to correlate information from images captured by the cameras 125 to data in the maps.

The vehicle 105 may further include a transceiver 130 configured to send and/or receive digital information from a remote server 140 via a wired and/or wireless connection such as, for example, through a wireless communication network 135, wherein the vehicle 105 and the remote server 140 are in electronic communication with each other. The computing device 120 of the calibration module may include a processor 145. The processor 145 may be configured to receive, using the transceiver 130, information pertaining to features of the environment at the location of the vehicle 105, and use the information and the orientation of the vehicle 105 to identify one or more of the objects 110, 111. It is noted that the processor 145 may be a standalone processor 145, the vehicle's 105 processor 145, and/or the remote server's 140 processor 145. Data processed by the processor 145 may be data received from the vehicle 105, received from the remote server 140, and/or a combination of data received from the vehicle 105 and the remote server 140. According to various embodiments, the computing device 120 may include one or more digital storage devices 150, and/or some or all of the digital information may be stored locally at the vehicle 105.

Each of the sensors is configured to generate data pertaining to objects 110, 111 that are within a range of detection of the sensors. By executing programming instructions that are part of an analysis module and/or a calibration module, the processor 145 is configured to analyze the sensor data in order to detect the objects 110, 111 and perform a calibration analysis on one or more of the cameras 125.

For example, as shown in FIG. 1, one or more objects 110, 111 are in the environment of the AV 105 and visible from the AV 105. Depending on the position/pose of the AV 105, these objects 110, 111 may be within the field of view of one or more cameras 125 coupled to the AV 105. However, if the calibration of one or more of the cameras 125 is invalid, the AV 105 may incorrectly determine a position of one or more of the objects 110, 111 in relation to the AV 105.

The calibration module of the AV 105 is configured to combine information from vehicle pose and object detection to validate whether camera calibration is correct. By using this information jointly, camera calibration can be validated accurately, in real-time. Processes by which the calibration module may do this in real-time while the AV 105 is moving or stationary in the environment will be described below.

Figure 2:
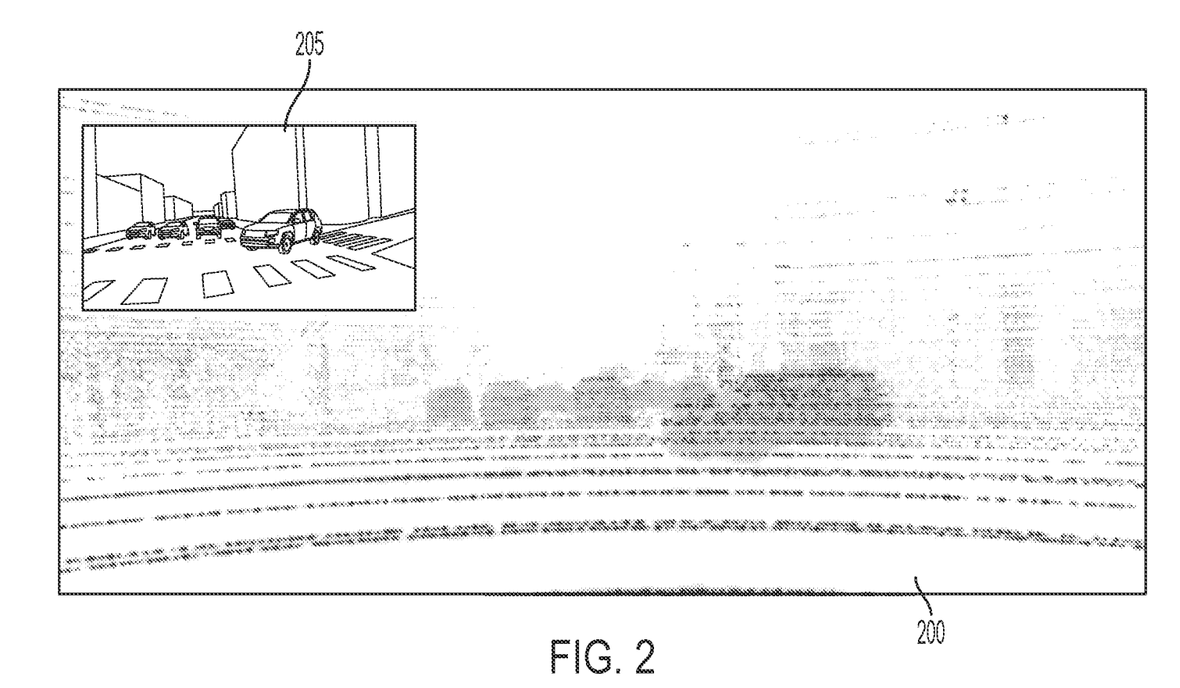
FIG. 2 is an example of a LIDAR camera projection, according to various embodiments of the present disclosure.

According to various embodiments, the calibration module calculates a vehicle pose calibration metric that can be used to validate camera calibration. In this process, two camera frames and LIDAR point cloud data, along with a transformation of the vehicle pose, are analyzed. The camera frames will be consecutive frames, which in this disclosure means that in a sequence of captured image frames, the frames are either immediately consecutive to each other (i.e., adjacent) or nearly-consecutive to each other (in which "nearly" means that the frames are captured no more than a very small threshold of time from each other, such as no more than 0.5 seconds, or 0.1 seconds, away from each other). According to various embodiments, the calibration module will use a processor of the AV to project points from the LIDAR point cloud 200 to a corresponding camera frame 205, as shown in FIG. 2. As will be described in more detail below in FIG. 4A, the system may project two sets of LIDAR points to two camera frames: (1) points from a LIDAR point cloud, corresponding to certain features of that frame, will be projected to a first camera frame; and (2) corresponding points from an estimated LIDAR point cloud that was generated using a vehicle pose transformation process, will be projected to a second camera frame. After projecting those two sets of points, the system will generate, a similarity metric to compare local patches on the camera frames, and it will use the similarity metric to assess whether camera calibration is accurate. This will be described in more detail below in the discussion of FIG. 4A-4C.

The calibration module further includes an object detection module configured to generate a distance calibration metric that can be used to validate camera calibration using object detection information. According to various embodiments, and as shown for example in FIG. 3, the object detection module will look for a particular object in the image, such as a traffic light, and it will project a three-dimensional (3D) bounding box 305 and a two-dimensional (2D) bounding box 310, onto a traffic light or other object. The 3D bounding box 305 may be a bounding box in which the object is labeled (in this case as a traffic light) by a human using a user interface, or by an automated labeling system. The 2D bounding box 310 may be one that is detected by a machine learning object detection system. Methods of identifying objects and assigning categorical labels to objects are well known in the art, and any suitable classification process may be used, such as those that make bounding box predictions for detected objects in a scene and use convolutional neural networks (CNNs) or other computer vision models. Some such processes are described in "Yurtsever et al., A Survey of Autonomous Driving: Common Practices and Emerging Technologies" (arXiv Apr. 2, 2020). These processes will also be described in more detail below in the discussion of FIG. 4B.

Figure 3:
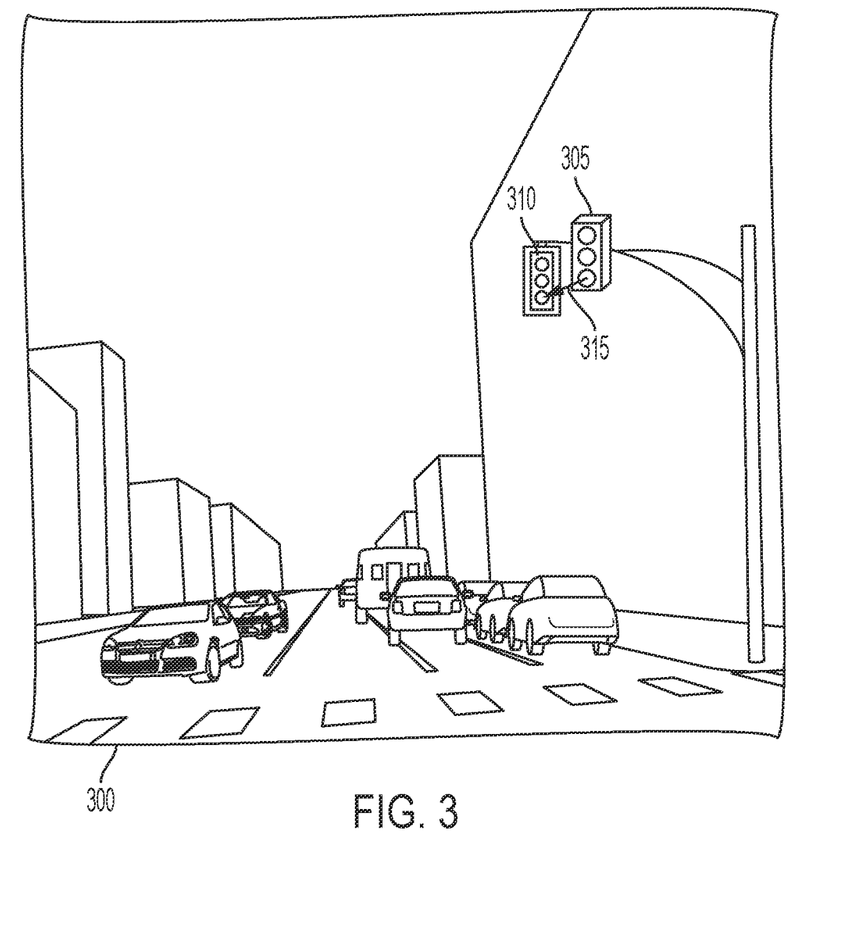
FIG. 3 is an example of a camera image having a superimposed 3D bounding box and a 2D bounding box, according to various embodiments of the present disclosure.

The system will project the 3D bounding box onto the camera frame 300, as shown in FIG. 3, and the system will generate a distance calibration metric 315 that is a measure of distance from the projected 3D bounding box 305 to the corresponding 2D bounding box 310.

Figure 4A:
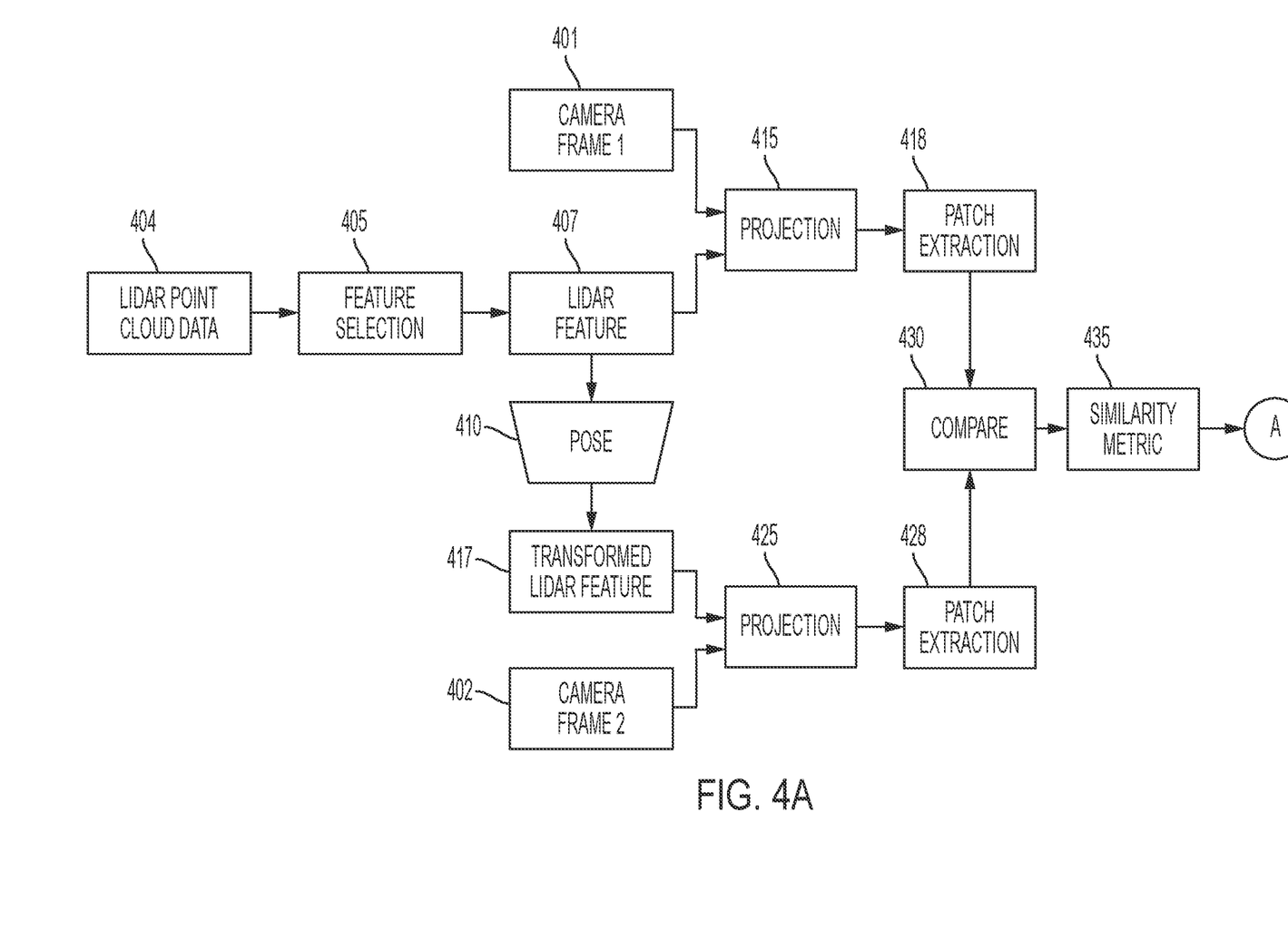
FIGS. 4A-4C illustrate various aspects of a method for validating camera calibration in autonomous vehicles, according to various embodiments of the present disclosure.
Figure 4B:
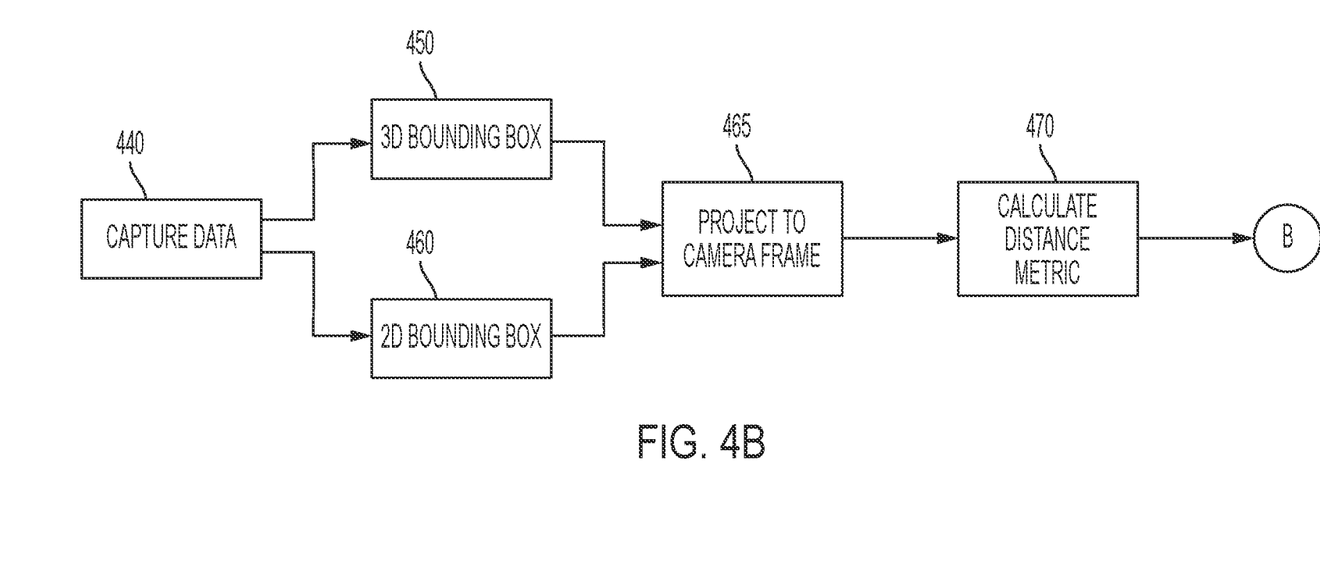
Figure 4C:
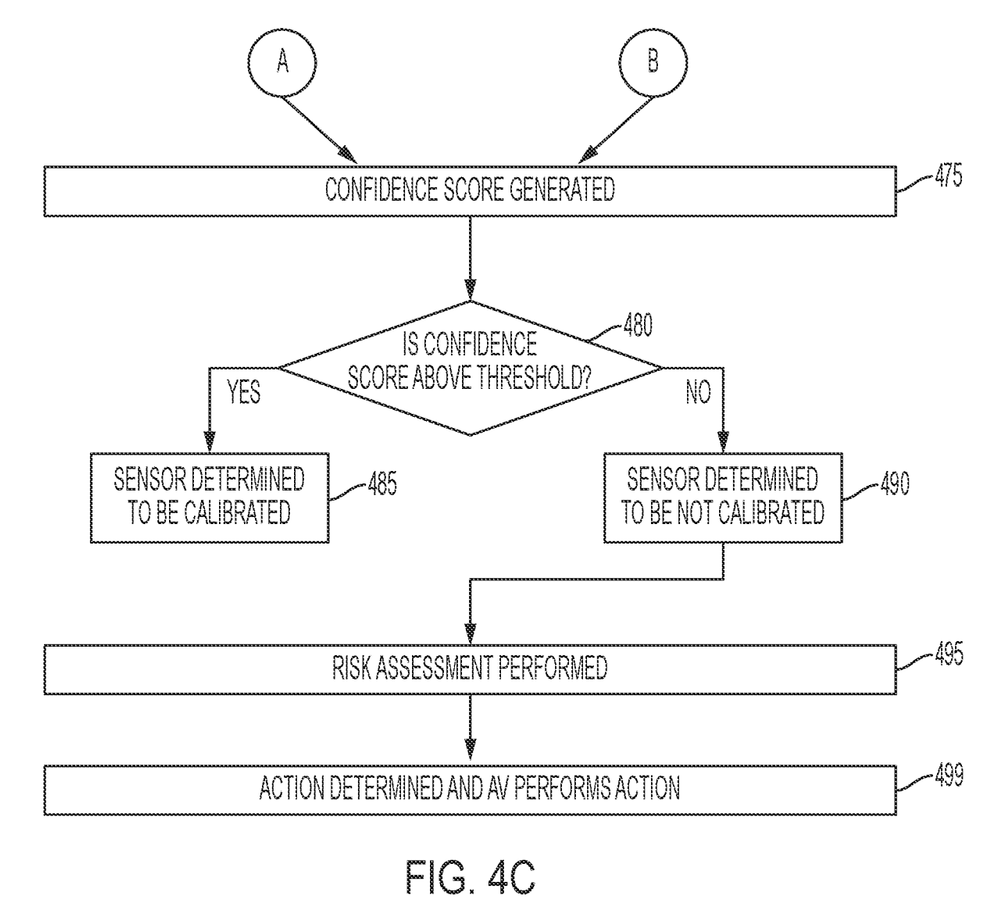

Referring now to FIGS. 4A-4C, a method for assessing and validating calibration of one or more cameras in an AV is illustratively depicted, in accordance with various embodiments of the present disclosure.

Referring to FIG. 4A, at 401, a first image frame is captured by a sensor of an AV at a first time point. According to various embodiments, the sensor is a camera. The camera may be positioned at any suitable location on the AV. At 402, a second image frame is captured by the same sensor (e.g., camera) of the AV at a second time point. The second time point will be immediately or nearly-immediately after the first time point so that the first image frame and the second image frame are consecutive frames. The calibration module will receive the first and second image frames as digital data, and it will use the frames to determine a pose calibration in the process shown in FIG. 4A.

At 404, a LIDAR point cloud is generated using a LIDAR system coupled to the AV. The LIDAR point cloud is generated at a time that overlaps with or is substantially close to the first time. The calibration module will receive the LIDAR point cloud data, and it will also use the LIDAR point cloud data to determine the pose calibration metric in the process shown in FIG. 4A. According to various embodiments, in order to reduce computation costs, the calibration module may include a feature selection module 405 configured to analyze points in the LIDAR point cloud to identify a feature 407 (i.e., an area) within the LIDAR point cloud that corresponds to the location of a particular object, The object may be a traffic light or another object that is also found in the first camera image. At 415, the LIDAR point cloud data corresponding to the selected feature (referred to in this document as "LIDAR feature data") is projected over the first image frame, forming a first projected image.

At 410 a pose transformation is applied to the LIDAR feature data to yield transformed LIDAR feature data 417. The pose transformation that uses differences in translation and rotation of the vehicle between Timestamp A (which in this situation will be the time of capture of the first image frame) and Timestamp B (which in this case will be the time of capture of the second image frame), along with the LIDAR point cloud captured at Timestamp A, to estimate what the LIDAR point cloud will look like at Timestamp B. An example pose transformation process is disclosed in, for example, Liao et al., Extrinsic Calibration of 3D Range Finder and Camera Without Auxiliary Object or Human Intervention" (2017). At 425 the transformed LIDAR feature data 417 is projected over the second image frame, forming a second projected image At 418 the system will extract a first patch from the first projected image, and at 428 the system will extract a second patch from the second projected image. Each patch will correspond to a portion of the image onto which the object was projected.

At 430, the system will compare the first patch of the first projected image and the second patch of the second projected image to calculate a similarity metric 435 between the two patches, which can then be used as an AV pose calibration metric. The AV pose calibration metric is indicative of calibration accuracy of the sensor (e.g., camera). According to various embodiments, the similarity metric may be a measure of zero mean normalized cross correlation (ZNCC) between the two images. Methods of calculating ZNCC are well known in the art and may be used here. However, this disclosure is not limited to the measurement of ZNCC; other similarity metrics may be used.

At 440, the AV's camera, LIDAR sensor and/or other sensors will capture data about an environment surrounding the AV, and the system will analyze that data to determine one or more objects within the environment. According to various embodiments, the data may include map data, images captured by cameras, LIDAR data and other data. A computing device of the AV analyzes map data in conjunction with position data of the AV in order to determine the location of one or more objects within the environment in relation to the AV. According to various embodiments, the one or more objects include one or more traffic lights. It is noted, however, that other object types may be identified, such as, for example, moving actors, parked vehicles and/or other objects. According to various embodiments, analyzing the environment surrounding the AV includes determining a position and/or pose of the AV within the environment.

Referring to FIG. 4B, after an image is captured at 440, at 450 a 3D object bounding box is generated. The 3D bounding box labels an object in the image. According to various embodiments, generating the 3D object bounding box includes determining a position of the object based on a calculated position and pose of the AV. This may be done automatically, by human labeling, or another process. At 460, the system analyzes the image to automatically generate a 2D object bounding box surrounding the object within the image, using processes such as those described above. At 465, the 3D object bounding box is projected over the 2D object bounding box and, at 470, a distance between the 3D object bounding box and the 2D object bounding box is calculated. This distance equates to a distance calibration metric. The system may calculate the distance metric using any suitable process. For example, the system may calculate the distance as the difference between the location of the center of the projected 3D bounding box and the center of the 2D bounding box.

Referring to FIG. 4C, after computing the two metrics described above (the pose calibration metric and the distance calibration metric), at 475 the system may use the two metrics to generate a confidence score, which is an assessment of confidence in the accuracy of the calibration of the camera that captured the image frames. The confidence score thus indicates a likelihood that the sensor (e.g., camera) is correctly calibrated. According to various embodiments, a weighted sum is used to combine the two metrics. For example, according to an embodiment, the confidence score may be calculated as confidence_score=aX+bY, where a and b are pre-defined constants, X is the similarity metric, and Y is the distance metric. It is noted, however, that other algorithms for generating the confidence score may be used, according to various embodiments, while maintaining the spirit and functionality of the present disclosure.

At 480, the system may determine whether the confidence score is above or below a threshold. According to various embodiments, the threshold may be a predetermined value that is stored in a memory such as a database. Alternatively, or in addition, the threshold may be updated and/or may be dynamic in nature. If the confidence score is above the threshold, then, at 485, the system may consider the sensor (e.g., camera) to be calibrated. If the confidence score is below the threshold, then, at 490, the system may consider the sensor (e.g., camera) be not calibrated.

When the system determines that the camera is not calibrated, then in response the system will generate a signal that will result in an action. The signal may be a communication to a user interface in the AV and/or an external server with a message indicating that that the camera is not calibrated. (The system also may generate an alternative message when the system determines that the camera is calibrated. In addition, if the sensor is determined to be not calibrated, then, at 495, an action assessment of the AV is performed, generating an action assessment score. The action assessment score correlates to a perceived likelihood that an event is too occur. If the action assessment score is above a threshold, then, at 499, the computing device of the AV determines an action for the AV to perform and causes the AV to perform the action. The action may include recalibrating the sensor, altering a trajectory of the AV, altering a velocity of the AV, and/or any other suitable action in response to the action assessment. According to various embodiments, the threshold for the action assessment score may be a predetermined that is stored in a memory such as a database. Alternatively, or in addition, the threshold may be updated and/or may be dynamic in nature.

Figure 5:
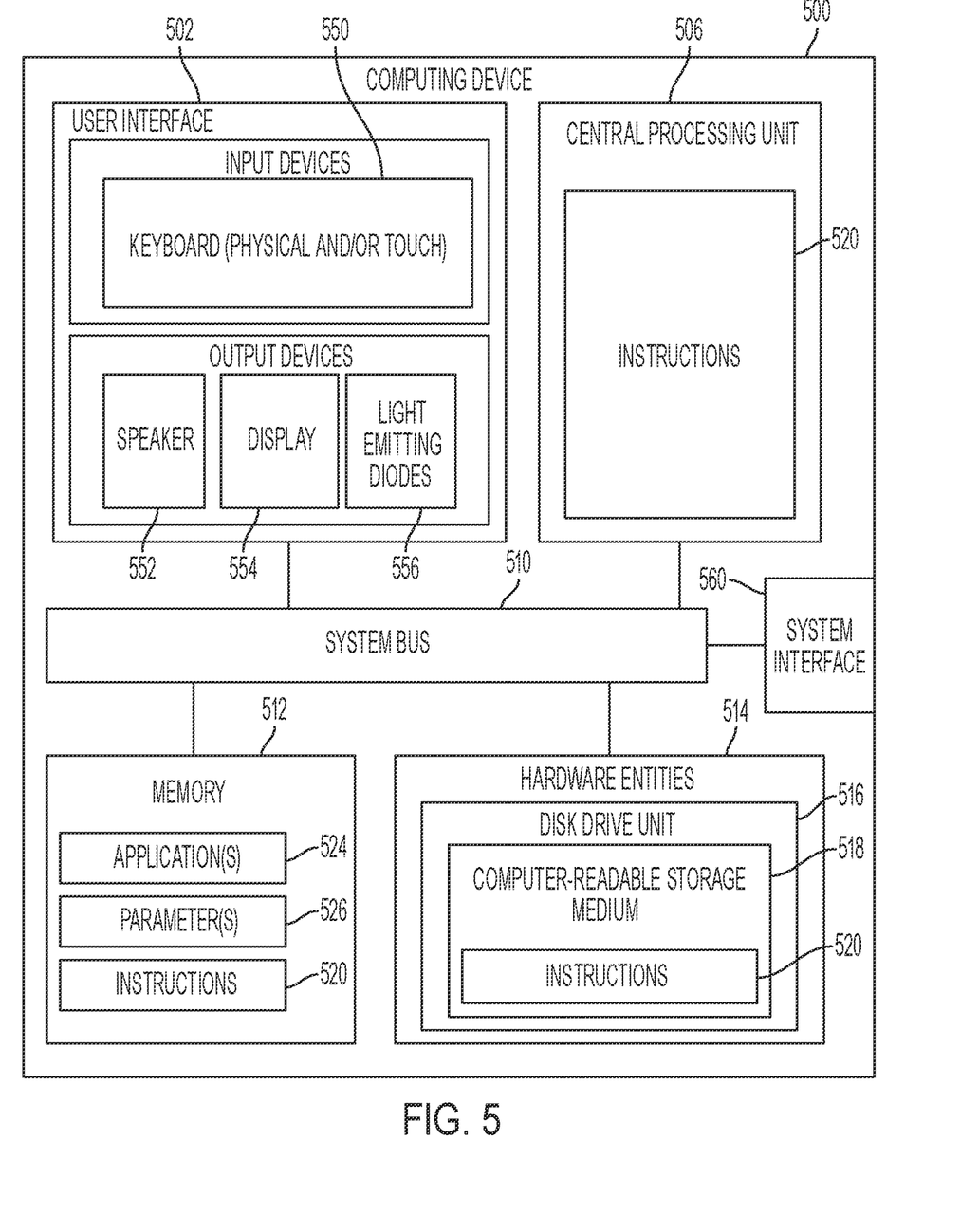
FIG. 5 is an illustration of various elements of an illustrative computing device, in accordance with the present disclosure.

Referring now to FIG. 5, an illustration of an illustrative architecture for a computing device 500 is provided. The computing device 120 of FIG. 1 is the same as or similar to computing device 500. As such, the discussion of computing device 500 is sufficient for understanding the computing device 120 of FIG. 1.

Computing device 500 may include more or less components than those shown in FIG. 1. However, the components shown are sufficient to disclose an illustrative solution implementing the present solution. The hardware architecture of FIG. 5 represents one implementation of a representative computing device configured to one or more methods and means for determining object trajectories, as described herein. As such, the computing device 500 of FIG. 5 implements at least a portion of the method(s) described herein.

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices include, but are not limited to, a physical and/or touch keyboard 550. The input devices can be connected to the computing device 500 via a wired or wireless connection (e.g., a Bluetooth® connection). The output devices include, but are not limited to, a speaker 552, a display 554, and/or light emitting diodes 556. System interface 560 is configured to facilitate wired or wireless communications to and from external devices (e.g., network nodes such as access points, etc.).

At least some of the hardware entities 514 perform actions involving access to and use of memory 512, which can be a random access memory ("RAM"), a disk drive, flash memory, a compact disc read only memory ("CD-ROM") and/or another hardware device that is capable of storing instructions and data. Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

Figure 6:
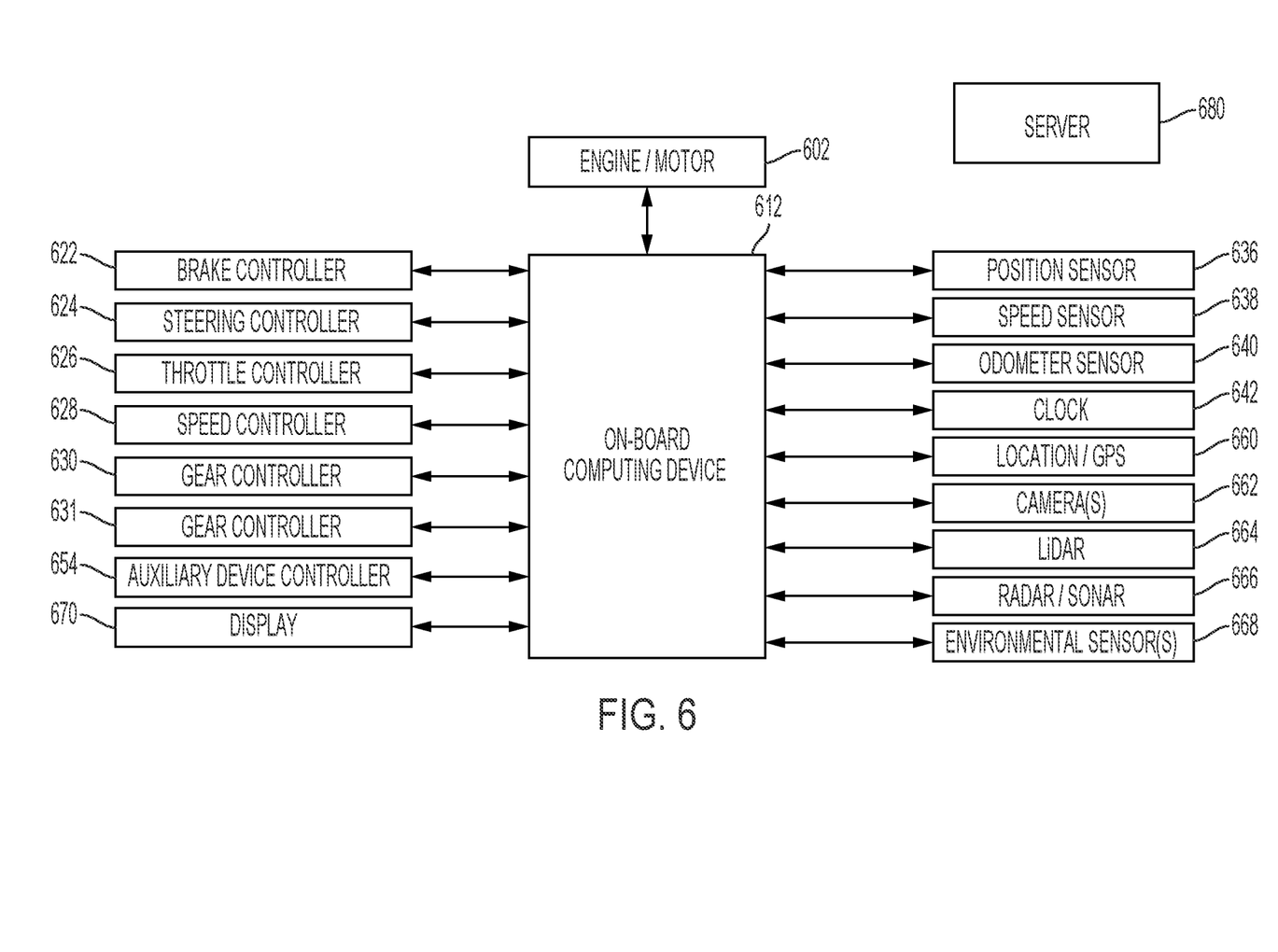
FIG. 6 illustrates example elements of an autonomous vehicle, in accordance with various embodiments of the present disclosure.

FIG. 6 illustrates an example system architecture for a vehicle 601, such as the AV 105 of FIG. 1. The vehicle 601 may include an engine or motor 602 and various sensors for measuring various parameters of the vehicle and/or its environment. Operational parameter sensors that are common to both types of vehicles include, for example: a position sensor 636 such as an accelerometer, gyroscope and/or inertial measurement unit; a speed sensor 638; and an odometer sensor 640. The vehicle 601 also may have a clock 642 that the system architecture uses to determine vehicle time during operation. The clock 642 may be encoded into the vehicle on-board computing device 612. It may be a separate device, or multiple clocks may be available. The computing device 120 of FIG. 1 and/or computing device 500 of FIG. 5 is the same as or similar to computing device 612.

The vehicle 601 also may include various sensors that operate to gather information about the environment in which the vehicle is traveling. These sensors may include, for example: a location sensor 660 such as a GPS device; object detection sensors such as one or more cameras 662; a LiDAR sensor system 664; and/or a radar and or and/or a sonar system 666. The sensors also may include environmental sensors 668 such as a precipitation sensor and/or ambient temperature sensor. The object detection sensors may enable the vehicle 601 to detect objects that are within a given distance or range of the vehicle 601 in any direction, while the environmental sensors collect data about environmental conditions within the vehicle's area of travel. The system architecture will also include one or more cameras 662 for capturing images of the environment. Any or all of these sensors will capture sensor data that will enable one or more processors of the vehicle's on-board computing device 612 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 612. The on-board computing device 612 analyzes the data captured by the sensors and optionally controls operations of the vehicle based on results of the analysis. For example, the on-board computing device 612 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 654.

Geographic location information may be communicated from the location sensor 660 to the on-board computing device 612, which may then access a map of the environment that corresponds to the location information to determine known fixed features of the environment such as streets, buildings, traffic lights, stop signs and/or stop/go signals. Captured images from the cameras 662 and/or object detection information captured from sensors such as a LiDAR system 664 is communicated from those sensors to the on-board computing device 612. The object detection information and/or captured images may be processed by the on-board computing device 612 to detect objects in proximity to the vehicle 601. In addition, or alternatively, the vehicle 601 may transmit any of the data to a remote server system 680 for processing. Any known or to be known technique for making an object detection based on sensor data and/or captured images can be used in the embodiments disclosed in this document.

In addition, the autonomous vehicle may include an onboard display device 670 that may generate and output interface on which sensor data, vehicle status information, or outputs generated by the processes described in this document (e.g., various maps and routing information) are displayed to an occupant of the vehicle. The display device may include, or a separate device may be, an audio speaker that presents such information in audio format. According to various embodiments, calibration results may be output on an in-dash display.

The on-board computing device 612 may obtain, retrieve, and/or create map data that provides detailed information about the surrounding environment of the autonomous vehicle 601. The on-board computing device 612 may also determine the location, orientation, pose, etc. of the AV in the environment (localization) based on, for example, three dimensional position data (e.g., data from a GPS), three dimensional orientation data, predicted locations, or the like. For example, the on-board computing device 612 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 612 in analyzing the surrounding environment of the autonomous vehicle 601.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 612 may also include and/or may receive information relating to the trip or route of a user, real-time traffic information on the route, or the like.

The on-board computing device 612 may include and/or may be in communication with a routing controller 631 that generates a navigation route from a start position to a destination position for an autonomous vehicle. The routing controller 831 may access a map data store to identify possible routes and road segments that a vehicle can travel on to get from the start position to the destination position. The routing controller 631 may score the possible routes and identify a preferred route to reach the destination. For example, the routing controller 631 may generate a navigation route that minimizes Euclidean distance traveled or other cost function during the route, and may further access the traffic information and/or estimates that can affect an amount of time it will take to travel on a particular route. Depending on implementation, the routing controller 631 may generate one or more routes using various routing methods, such as Dijkstra's algorithm, Bellman-Ford algorithm, or other algorithms. The routing controller 631 may also use the traffic information to generate a navigation route that reflects expected conditions of the route (e.g., current day of the week or current time of day, etc.), such that a route generated for travel during rush-hour may differ from a route generated for travel late at night. The routing controller 631 may also generate more than one navigation route to a destination and send more than one of these navigation routes to a user for selection by the user from among various possible routes.

In various embodiments, an on-board computing device 612 may determine perception information of the surrounding environment of the autonomous vehicle 601. Based on the sensor data provided by one or more sensors and location information that is obtained, the on-board computing device 612 may determine perception information of the surrounding environment of the autonomous vehicle 601. The perception information may represent what an ordinary driver would perceive in the surrounding environment of a vehicle. The perception data may include information relating to one or more objects in the environment of the autonomous vehicle 601. For example, the on-board computing device 612 may process sensor data (e.g., LiDAR or RADAR data, camera images, etc.) to identify objects and/or features in the environment of autonomous vehicle 601. The objects may include traffic signals, roadway boundaries, other vehicles, pedestrians, and/or obstacles, etc. The on-board computing device 612 may use any now or hereafter known object recognition algorithms, video tracking algorithms, and computer vision algorithms (e.g., track objects frame-to-frame iteratively over a number of time periods) to determine the perception.

In some embodiments, the on-board computing device 612 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 612 may perform one or more prediction and/or forecasting operations. For example, the on-board computing device 612 may predict future locations, trajectories, and/or actions of one or more objects. For example, the on-board computing device 612 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 601, the surrounding environment, and/or their relationship(s). For example, if an object is a vehicle and the current driving environment includes an intersection, the on-board computing device 612 may predict whether the object will likely move straight forward or execute a turn. If the perception data indicates that the intersection has no traffic light, the on-board computing device 612 may also predict whether the vehicle may have to fully stop prior to enter the intersection.

In various embodiments, the on-board computing device 612 may determine a motion plan for the autonomous vehicle. For example, the on-board computing device 612 may determine a motion plan for the autonomous vehicle based on the perception data and/or the prediction data. Specifically, given predictions about the future locations of proximate objects and other perception data, the on-board computing device 612 can determine a motion plan for the autonomous vehicle 601 that best navigates the autonomous vehicle relative to the objects at their future locations.

In one or more embodiments, the on-board computing device 612 may receive predictions and make a decision regarding how to handle objects and/or actors in the environment of the autonomous vehicle 601. For example, for a particular actor (e.g., a vehicle with a given speed, direction, turning angle, etc.), the on-board computing device 612 decides whether to overtake, yield, stop, and/or pass based on, for example, traffic conditions, map data, state of the autonomous vehicle, etc. Furthermore, the on-board computing device 612 also plans a path for the autonomous vehicle 601 to travel on a given route, as well as driving parameters (e.g., distance, speed, and/or turning angle). That is, for a given object, the on-board computing device 612 decides what to do with the object and determines how to do it. For example, for a given object, the on-board computing device 612 may decide to pass the object and may determine whether to pass on the left side or right side of the object (including motion parameters such as speed). The on-board computing device 612 may also assess the possibility of a collision between a detected object and the autonomous vehicle 601. If the possibility exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 612 may execute one or more control instructions to perform a cautious maneuver (e.g., mildly slow down, accelerate, change lane, or swerve). In contrast, if the collision cannot be avoided, then the on-board computing device 612 may execute one or more control instructions for execution of an emergency maneuver (e.g., brake and/or change direction of travel).

As discussed above, planning and control data regarding the movement of the autonomous vehicle is generated for execution. The on-board computing device 612 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method of determining whether a camera of an autonomous vehicle (AV) is calibrated, comprising:
   using a plurality of image frames captured by a camera of an AV and LIDAR point clouds captured by a LIDAR system of the AV to calculate an AV pose calibration metric for the AV;
   measuring a distance between a three-dimensional (3D) bounding box applied by the LIDAR system around an object and a two-dimensional (2D) bounding box in an image captured by the camera to calculate a distance calibration metric, wherein measuring the distance between the 3D bounding box and the 2D bounding box comprises measuring a distance between a center of the 3D bounding box and a center of the 2D bounding box;
   calculating a weighted sum using the AV pose calibration metric and the distance calibration metric to generate a confidence score; and
   in response to the confidence score being below a threshold, generating a signal indicating that the camera is not calibrated.

2. The method of claim 1, wherein calculating the AV pose calibration metric for the AV comprises:
   receiving a first image frame that the camera captured in a sequence at a first time point;
   receiving a second image frame that the camera captured at a second time point that is consecutive to the first time point in the sequence as the AV moves in its environment, resulting in a change in pose between the first time point and the second time point;
   receiving LIDAR point cloud data that the LIDAR system captured at the first time point or the second time point;
   projecting the LIDAR point cloud data over the first image frame to form a first projected image;
   transforming the LIDAR point cloud data to account for the change in pose between the first time point and the second time point, yielding transformed point cloud data;
   projecting the transformed point cloud over the second image frame to form a second projected image;
   comparing the first projected image and the second projected image by applying a normalized cross-correlation to the first projected image and the second projected image to determine an amount of similarity; and
   using the amount of similarity to calculate the AV pose calibration metric.

3. The method of claim 2, further comprising:
   by the camera:
      capturing the first image frame at the first time point, and
      capturing the second image frame at the second time point; and
      by the LIDAR system, generating the LIDAR point cloud data.

4. The method of claim 1, wherein calculating the distance calibration metric comprises:
   identifying the object in the image;
   applying a 3D bounding box to the object in the LIDAR system data;
   applying a 2D bounding box to the object in the image;
   projecting the 3D bounding box over the image; and
   calculating the distance as a distance between the projected 3D bounding box and the 2D bounding box.

5. The method of claim 4, wherein identifying the object in the image comprises identifying a traffic light in the image.

6. The method of claim 1, further comprising, in response to the confidence score being below the threshold, performing an action assessment of the AV.

7. The method of claim 6, further comprising, based on the action assessment, causing the AV to perform an action.

8. The method of claim 7, wherein the action includes one or more of the following:
   recalibrating the camera;
   altering a trajectory of the AV; or
   altering a velocity of the AV.

9. A camera calibration system, comprising:
   a processor; and
   a memory that contains programming instructions that are configured to instruct the processor to:
      use a plurality of image frames captured by a camera of an autonomous vehicle (AV) and LIDAR point clouds captured by a LIDAR system of the AV to calculate an AV pose calibration metric for the AV,
      measure a distance between a center of a three-dimensional (3D) bounding box applied by the LIDAR system around an object and a center of a two-dimensional (2D) bounding box in an image captured by the camera to calculate a distance calibration metric,
      calculate a weighted sum using the AV pose calibration metric and the distance calibration metric to generate a confidence score, and
      in response to the confidence score being below a threshold, generate a signal indicating that the camera is not calibrated.

10. The system of claim 9, wherein the instructions to calculate the AV pose calibration metric for the AV comprise instructions to:
    receive a first image frame that the camera captured in a sequence at a first time point;
    receive a second image frame that the camera captured at a second time point that is consecutive to the first time point in the sequence as the AV moves in its environment, resulting in a change in pose between the first time point and the second time point;
    receive LIDAR point cloud data that the LIDAR system captured at the first time point or the second time point;
    project the LIDAR point cloud data over the first image frame to form a first projected image;
    transform the LIDAR point cloud data to account for the change in pose between the first time point and the second time point, yielding transformed point cloud data;
    project the transformed point cloud over the second image frame to form a second projected image;
    compare the first projected image and the second projected image by applying a normalized cross-correlation to the first projected image and the second projected image to determine an amount of similarity; and
    use the amount of similarity to calculate the AV pose calibration metric.

11. The system of claim 10, further comprising:
    the camera:

the LIDAR system; and additional programming instructions that are configured to instruct the processor to:
- cause the camera to capture the first image frame at the first time point,
- cause the camera to capture the second image frame at the second time point, and
- cause the LIDAR system to generate the LIDAR point cloud data.

12. The system of claim 9, wherein the instructions to calculate the distance calibration metric comprise instructions to:
- identify the object in the image;
- generate a 3D bounding box around the object in the LIDAR system data;
- generate a 2D bounding box around the object in the image;
- project the 3D bounding box over the image; and
- calculate the distance as a distance between the 3D bounding box and the 2D bounding box.

13. The system of claim 12, wherein the instructions to identify the object in the image comprise instructions to identify a traffic light in the image.

14. The system of claim 9, wherein the memory further includes instructions that are configured to cause the processor to:
- in response to the confidence score being below the threshold, perform an action assessment of the AV.

15. The system of claim 14, wherein the memory further includes instructions that are configured to cause the processor to:
- based on the action assessment, cause the AV to perform an action.

16. The system of claim 15, wherein the action includes one or more of the following:
- recalibrating the camera;
- altering a trajectory of the AV; or
- altering a velocity of the AV.

17. A non-transitory computer-readable medium that stores instructions that are configured to, when executed by a computing device, cause the computing device to:
- use a plurality of image frames captured by a camera of an AV and LIDAR point clouds captured by a LIDAR system of the AV to calculate an AV pose calibration metric for the AV;
- measure a distance between a center of a three-dimensional (3D) bounding box applied by the LIDAR system around an object and a center of a two-dimensional (2D) bounding box in an image captured by the camera to calculate a distance calibration metric;
- calculate a weighted sum using the AV pose calibration metric and the distance calibration metric to generate a confidence score; and
- in response to the confidence score being below a threshold, generate a signal indicating that the camera is not calibrated.

18. The non-transitory computer-readable medium of claim 17, wherein the instructions to calculate the AV pose calibration metric for the AV comprise instructions to:
- receive a first image frame that the camera captured in a sequence at a first time point;
- receive a second image frame that the camera captured at a second time point that is consecutive to the first time point in the sequence as the AV moves in its environment, resulting in a change in pose between the first time point and the second time point;
- receive LIDAR point cloud data that the LIDAR system captured at the first time point or the second time point;
- project the LIDAR point cloud data over the first image frame to form a first projected image;
- transform the LIDAR point cloud data to account for the change in pose between the first time point and the second time point, yielding transformed point cloud data;
- project the transformed point cloud over the second image frame to form a second projected image;
- compare the first projected image and the second projected image by applying a normalized cross-correlation to the first projected image and the second projected image to determine an amount of similarity; and
- use the amount of similarity to calculate the AV pose calibration metric.

19. The non-transitory computer-readable medium of claim 17, wherein the instructions to calculate the distance calibration metric comprise instructions to:
- identify the object in the image;
- generate a 3D bounding box around the object in the LIDAR system data;
- generate a 2D bounding box around the object in the image;
- project the 3D bounding box over the image; and
- calculate the distance as a distance between the 3D bounding box and the 2D bounding box.

20. The non-transitory computer-readable medium of claim 17, further comprising instructions that are configured to cause the computing device to:
- in response to the confidence score being below the threshold, cause the AV to perform an action that comprises one or more of the following:
  - recalibrating the camera;
  - altering a trajectory of the AV; or
  - altering a velocity of the AV.

* * * * *